US012079339B2

(12) United States Patent
Chaudhari et al.

(10) Patent No.: US 12,079,339 B2
(45) Date of Patent: Sep. 3, 2024

(54) IN-MEMORY SCANNING FOR FILELESS MALWARE ON A HOST DEVICE

(71) Applicant: VMware, Inc., Palo Alto, CA (US)

(72) Inventors: Kedar Bhalchandra Chaudhari, Pune (IN); Pranav Gokhale, Pune (IN); Mandar Barve, Pune (IN)

(73) Assignee: VMware, Inc., Palo Alto, CA (US)

( * ) Notice: Subject to any disclaimer, the term of this patent is extended or adjusted under 35 U.S.C. 154(b) by 292 days.

(21) Appl. No.: 17/743,274

(22) Filed: May 12, 2022

(65) Prior Publication Data

US 2023/0367877 A1 Nov. 16, 2023

(51) Int. Cl.
G06F 21/00 (2013.01)
G06F 21/53 (2013.01)
G06F 21/56 (2013.01)

(52) U.S. Cl.
CPC ............ G06F 21/566 (2013.01); G06F 21/53 (2013.01)

(58) Field of Classification Search
CPC .......................... H04L 9/3247; H04L 9/3249
See application file for complete search history.

(56) References Cited

U.S. PATENT DOCUMENTS

2009/0158432 A1   6/2009  Zheng et al.
2012/0144489 A1*  6/2012  Jarrett ................ G06F 9/45558
                                                           726/24
2018/0283717 A1  10/2018  Wang

OTHER PUBLICATIONS

Matos, Taina, "International Search Report & Written Opinion", International Application No. PCT/US2023/011907, mailed Jun. 2, 2023, 8 pages.
Saad, et al., "UJsless: A Tale of a Fileless Javascript Memory-Resident Malware", Information Security Practice and Experience: 15th International Conference, ISPEC 2019, Kuala Lumpur, Malaysia, Nov. 26-28, 2019, Proceedings 15, Springer International Publishing, 2019, retrieved Mar. 18, 2023, https://www.researchgate.net/publication/337342081_JSLess_A_Tale_of_a_Fileless_Javascript_Memory-Resident_Malware, 20 pages.
Cooper. "Fileless malware attacks explained (with examples)." Comparitech. May 14, 2021, retrieved on Mar. 18, 2023, https://www.comparitech.com/blog/information-security/fileless-malware-attacks/, 21 pages.
Botacin et al., "Near-memory & in-memory detection of fileless malware" The International Symposium on Memory Systems. 2020, retrieved Mar. 18, 2023, https://dl.acm.org/doi/abs/10.1145/3422575.3422775, 17 pages.

(Continued)

Primary Examiner — Tri M Tran
(74) Attorney, Agent, or Firm — King Intellectual Asset Management

(57) ABSTRACT

The disclosure herein describes the processing of malware scan requests from VCIs by an anti-malware scanner (AMS) on a host device. A malware scan request is received by the AMS from a VCI, the malware scan request including script data of a script from a memory buffer of the VCI. The AMS scans the script data of the malware scan request, outside of the VCI, and determines that the script includes malware. The AMS notifies the VCI that the script includes malware, whereby the VCI is configured to prevent execution of the script or take other mitigating action. The AMS provides scanning for fileless malware to VCIs on a host device without consuming or otherwise affecting resources of the VCIs.

20 Claims, 9 Drawing Sheets

(56) References Cited

OTHER PUBLICATIONS

Prall et al., "Detecting Fileless Attacks with Enterprise EDR's AMSI Visibility", VMware, Mar. 18, 2020, retrieved Mar. 18, 2023, https://blogs.vmware.com/security/2020/03/detecting-fileless-attacks-with-enterprise-edrs-amsi-visibility.html, 8 pages.

* cited by examiner

IN-MEMORY SCANNING FOR FILELESS MALWARE ON A HOST DEVICE

BACKGROUND

In many modern enterprise networks, malware prevention systems are deployed on endpoint devices to identify and manage malware. Previously, some malware is stored as a file in a filesystem on the endpoint device, but malware creators have developed evasion techniques to avoid detection. For example, fileless malware aims to evade detection by being stored directly in endpoint memory while leaving no or minimal traces in the filesystem. Such malware presents challenges to the existing malware prevention systems that are configured to scan files, but not memory, on endpoints to enforce malware prevention policies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for processing malware scan requests for scripts from virtual computing instances (VCIs) by an anti-malware scanner (AMS) on a host device is described. A malware scan request is received by the AMS from a VCI, the malware scan request including script data of a script from a memory buffer of the VCI. The AMS scans the script data of the malware scan request and determines that the script includes malware. In response to the malware scan request, the AMS notifies the VCI that the script includes malware, whereby the VCI is configured to prevent execution of the script.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 9, the systems are illustrated as schematic drawings. The drawings may not be to scale.

DETAILED DESCRIPTION

Figure 1:
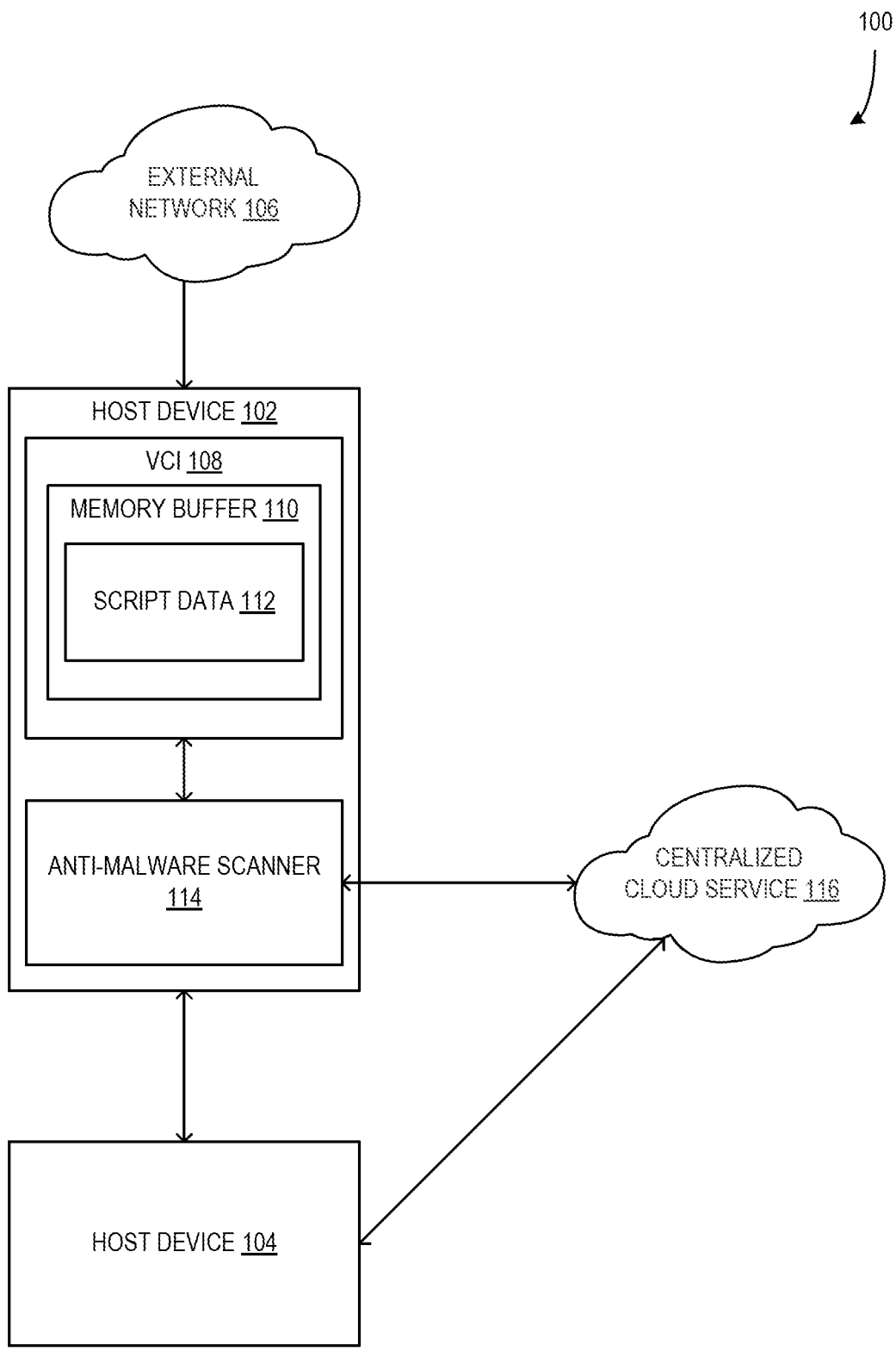
FIG. 1 is a block diagram illustrating a system configured to prevent fileless malware in virtual computing instances (VCIs) on host devices.

Aspects of the disclosure provide a computerized method and system for processing malware scan requests for scripts from virtual computing instances (VCIs) by an anti-malware scanner (AMS) on a host device. VCIs that are executing on a host device are configured to execute scripts, in memory, which may include malware. The described AMS runs on the same host device but separately from the execution environment or context of the VCIs, and exposes a scan interface to the VCIs. The VCIs are configured to use the scan interface of the AMS to send malware scan requests to the AMS prior to executing scripts that are stored in the memory buffers of the VCIs. The AMS scans the script data of the scripts for malware in response to the malware scan requests. Upon determining that a script includes malware, the AMS notifies the requesting VCI that the script includes malware, whereby the VCI is configured to prevent the script from executing (or take other mitigating measures). Alternatively, upon determining that the script does not include malware, the AMS notifies the VCI that the script does not include malware, whereby the VCI proceeds to execute the script.

In some examples, the VCI sends the malware scan request to the AMS and executes the script in parallel, but then suspends execution if the AMS indicates that the script contains malware. This occurs in situations where the VCI has made a preliminary or initial determination that the script is not malware (e.g., the VCI has made such a determination with an associated confidence factor exceeding a threshold for executing the script).

The disclosure operates in an unconventional manner at least by configuring the AMS to obtain and/or receive script data of scripts from memory buffers of VCIs for malware scanning. By scanning the script data from such memory buffers, fileless malware present in the script data can be identified, such as without analyzing files or other data storage structures.

Further, the disclosure enables the execution of AMSs on host devices, such execution being separate, independent, or otherwise distinct from execution of the VCIs on those same host devices. In some examples, the AMS of a host device is configured to perform malware scanning operations as described herein without consuming or otherwise affecting the computation, memory, or storage resources that are allocated to the VCIs. Further, because the AMS of a host device is centralized with respect to the VCIs executing on the host device, the script verdicts need only be maintained in one place on the host device, and all VCIs thereon the host device benefit from cached script verdicts of the AMS.

The disclosure enables the AMS and associated modules to detect and prevent execution of fileless malware. File-based malware is typically stored in a file in a file system on the computing device. In contrast, fileless malware is stored in memory on the computing device. Such malware is configured to reduce its footprint in the filesystem by using binaries, libraries, utilities, and/or script interpreters already available on the system. For example, the operating system already includes different types of scripting engines, interpreters, and/or just-in-time compilers. Fileless malware exploits these existing tools and utilities to execute their code. As a result, there is typically no need for the malware to deploy any additional executables, applications, or utilities, thus reducing the malware footprint and reducing detectability using existing systems.

Further, such fileless malware prevents analysis by conventional endpoint anti-malware solutions by using a reflective loading technique. When this technique is used, malicious binary implants are not saved on the disk as a file. Instead, they are downloaded over a network connection and executed fully in memory. This minimizes exposure of malware implants to detection and prevention. Fileless malware can be loaded into memory and executed by existing scripting engines without creating any files or other storage structures. As a result, this type of malware leaves no trace on the endpoint filesystem.

The disclosure is configured to detect and prevent execution of such fileless malware with respect to scripts on VCIs. The described AMS and associated modules have the benefit of agent-less scanning of script data directly extracted from memory buffers of VCIs. It provides scale benefits where scripts can be analyzed by the AMS outside of the VCIs (e.g., outside of the execution environment of the VCIs, outside of the workload of the VCIs, independent of the VCIs, or the like) in a per-host organization. Further, script verdicts that are determined by centralized script analysis can be shared among all the AMSs executing on different host devices of the system, such that each analysis benefits many different VCIs throughout the datacenter or enterprise, and redundant script processing is reduced. This improves the functioning of the overall datacenter as well as each host device therein.

In some examples, traditional intrusion detection system (IDS) or intrusion prevention system (IPS) solutions reside at the gateway and do not have access to the un-obfuscated code being executed at the endpoints. These solutions only have access to the artifacts being downloaded and must base their analysis on these artifacts alone. In contrast, the described AMS system is configured access the script data just before the script is executed and in plain text, at which point it is enabled to block or allow its execution.

FIG. 1 is a block diagram illustrating a system 100 configured to prevent fileless malware in VCIs 108 on host devices 102-104. In some examples, the system 100 enables the prevention of the execution of fileless malware in scripts (e.g., the script data 112 in the memory buffer 110 of a VCI 108). The system 100 includes multiple host devices 102-104 that are configured to host and execute VCIs as described herein. While two host devices are illustrated, in other examples, more, fewer, or different host devices are included in the system 100 without departing from the description.

Each host device 102-104 is a computing device (e.g., a computing device as described below with respect to FIG. 9). In some examples, the host devices 102-104 of the system are configured to communicate with each other, other entities of the associated datacenter, and/or other entities outside of the datacenter (e.g., entities in the external network 106 and/or the centralized cloud service 116). It should be understood that the host devices 102-104 of the system 100 are configured to be used to deploy and execute VCIs based requests made by customers of the system 100 and/or other entities (e.g., a customer requests a set of computing tasks to be performed and is assigned one or more VCIs with allocated computing resources, memory resources, and/or data storage resources). Because the described script analysis is configured to occur outside of the VCIs in the AMS 114 and other components, the resources allocated to the VCIs are unaffected by the script analysis processes.

At the host device 102 executing in the system 100, a request from a VCI 108 (e.g., a virtual machine (VM), container, or the like) is received for executing a script that is represented by script data 112 in a memory buffer 110 of the VCI 108. In some examples, the script data 112 is received from a connection to an external network 106 (e.g., an intranet, the Internet, or the like). The VCI 108 is configured to provide the script data 112 to the AMS 114 in a malware scan request prior to executing the script. In some examples, the script data 112 includes text of the script in the memory buffer 110, information about the script engine that will be used to execute script, information about source of the script, or the like.

If the AMS 114 provides a verdict indicating that the script includes malware, the VCI 108 is configured to prevent the script from being executed (e.g., the script is halted, isolated, terminated, or the like). Alternatively, or additionally, if the AMS 114 provides a verdict indicating that the script does not include malware, the VCI 108 is configured to execute the script. In other examples, the AMS 114 and/or VCI 108 are configured to generate and handle other types of script verdicts (e.g., a verdict that the script is currently unknown and may include malware) without departing from the description.

In an example set of results, 'RESULT_CLEAN' indicates that the script does not include malware, 'RESULT_NOT_DETECTED' indicates that the verdict of the script is unknown, and it may include malware, and 'RESULT_DETECTED' indicates that the malware has been detected in the script. Further, in some examples, a 'RESULT_BLOCKED_BY_ADMIN' result is a verdict result that can be assigned to scripts to control their execution based on administrative rules while using the same systems as described herein. For instance, in some examples, centralized IT policies are defined that dictate execution of certain macros or allow/block execution of scripted browser plugins. If such macros and/or plugins are detected by the described system, these results can be returned to indicate their blocked status.

In some examples, the AMS 114 includes hardware, firmware, and/or software that is configured to determine whether a script is a known script that has been previously assessed to contain malware based on the provided script data 112 in a malware scan request. Additionally, or alternatively, based on a determination that the script is unknown, the AMS 114 is configured to analyze the unknown script data 112 and/or interact with a centralized cloud service 116 that is configured to further analyze the unknown script data 112. In such examples, when a determination of the script data is made by the centralized cloud service 116 or other entity, the verdict associated with the script data is provided to and stored by the AMS 114 of the host device 102 (e.g., the verdict indicates that the script associated with the script data 112 does include malware or that the script associated with the script data 112 does not include malware). The AMS 114 is configured to store such script verdicts in a cache, such that recognized scripts can be scanned quickly by the AMS 114 without interaction with other entities such as the centralized cloud service 116.

Further, in some examples, the centralized cloud service 116 and/or the host devices 102-104 are configured to spread determined script verdicts to other host devices (e.g., host device 104) that also include AMSs and VCIs as described with respect to host device 102. In such examples, a script verdict of a script to be executed in one VCI can be distributed to multiple AMSs throughout the host devices 102-104 of the data center, such that the caches of those AMSs are populated with that script verdict. It should be understood that the other host devices 104 also include AMSs and that they are configured to also send script data to the centralized cloud service 116 for analysis as described herein.

In some examples, the analysis provided by the centralized cloud service 116 includes sandboxing, which includes executing the script on a computing device or VCI that is isolated from other entities such that the effects of the script can be observed but any malicious effects are unable to affect important processes or access sensitive data. Additionally, or alternatively, the AMS 114 of the host device 102 is configured to perform sandboxing on some script data 112, rather than send it to the centralized cloud service 116. Observation of the results of executing a script in a sandbox environment can yield positive or negative verdicts as to whether a script includes malware (e.g., detecting whether the script attempts to access sensitive data to which it should not have access and/or detecting whether the script attempts to interfere with important processes of the system). In some examples, such verdicts of the sandboxing analysis are linked to identifiers of the script and/or patterns of script data in the script, such that the verdicts can be stored in a map (e.g., script data identifiers and/or patterns mapped to verdicts) in the cache of the AMS 114. The AMS 114 is enabled to identify verdicts for future script data 112 based on identifying the identifiers and/or patterns in the script data 112 and mapping those identified data to verdicts in the cache.

Additionally, in some examples, the AMS 114 is configured to receive and/or obtain the script data 112 from the memory buffer 110 of the VCI 108 in plain text or in an otherwise un-obfuscated format. For instance, the exposed interface of the AMS 114 requires data input of the plain text of the script data 112 from the memory buffer 110 to call the scan function of the AMS 114, such that the VCI 108 is configured to provide that plain text script data 112 when calling the scan function via the interface. As described, the scanning of the script data 112 is done outside of the VCI 108 itself, such that the VCI 108 consumes minimal or no processing resources for the scan to be performed. This improves the functioning of the VCI.

In some examples, a host device 102 includes multiple anti-malware scanning applications. In some such examples, if the AMS 114 is unable to provide a definitive verdict after scanning script data 112, the host device 102 is configured send the script data 112 to another available anti-malware scanning application for scanning. If the other application generates a verdict, that verdict is provided to the VCI 108 that is the source of the malware can request and/or to the AMS 114 for use during future scanning requests.

It should be understood that, while the disclosure describes the application of anti-malware processes to VCIs, in other examples, the described anti-malware processes are applied to other types of computing entities without departing from the description. For instance, in other examples, the described anti-malware processes are applied to virtual machines, containers, personal computers, servers, mobile computing devices, computing devices dedicated to specific purposes, and/or other types of computing devices without departing from the description.

Figure 2:
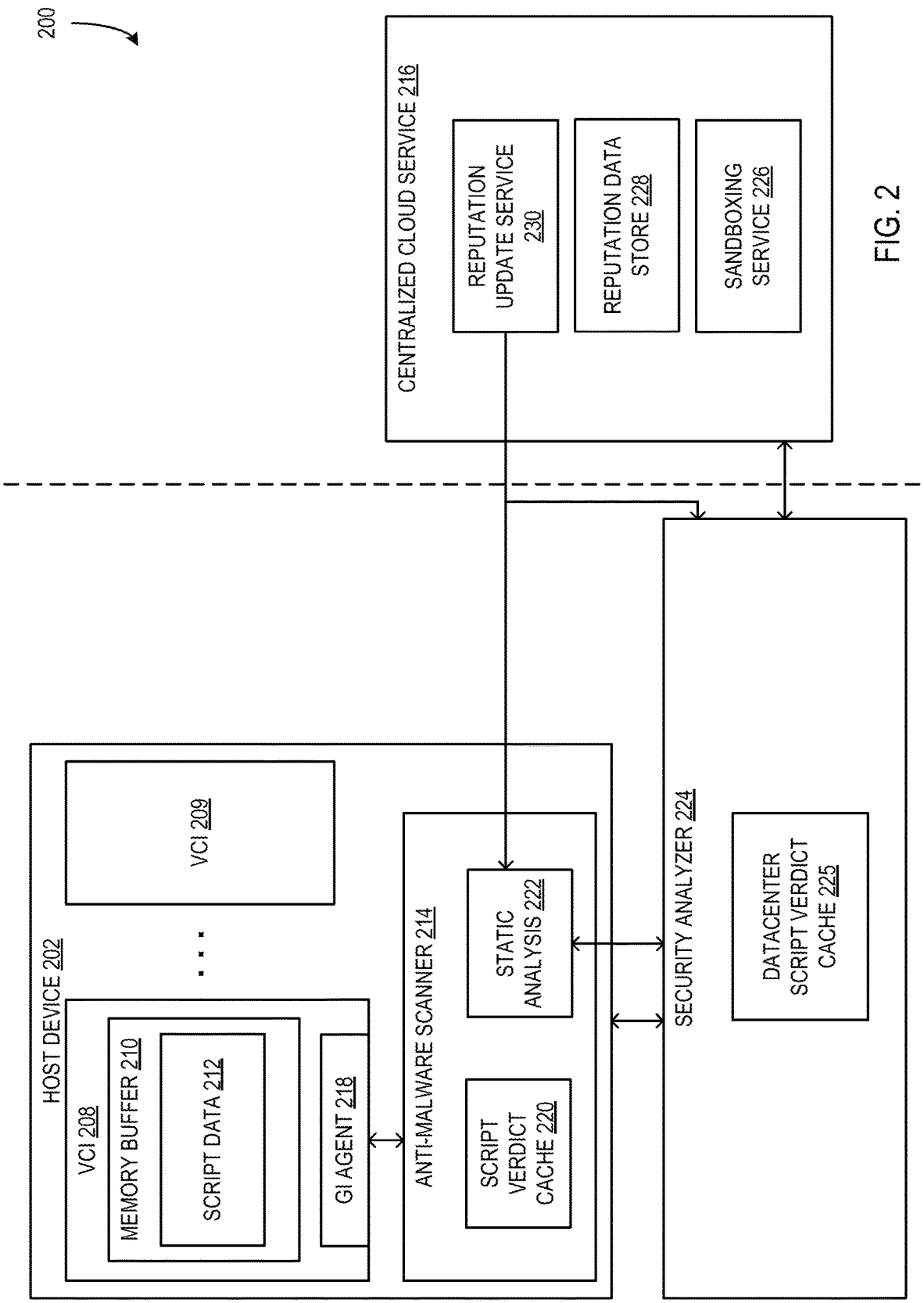
FIG. 2 is a block diagram illustrating a system configured to scan script data of VCIs using multiple levels of malware detection.

FIG. 2 is a block diagram illustrating a system 200 configured to scan script data 212 of VCIs 208-209 using multiple levels of malware detection. In some examples, the illustrated components of system 200 are included in a system such as system 100 of FIG. 1. The analysis of script data 212 in the system 200 includes analysis at the host device level via the AMS 214, analysis by the static analysis module 222 and/or security analyzer 224, and analysis by the sandboxing service 226 (or other cloud-based services) at the cloud service level (e.g., the centralized cloud service 116 of FIG. 1).

In some examples, the host device 202 executes VCIs 208-209 that communicate with a security hub that includes the AMS 214 via a multiplexer (MUX). The VCIs 208-209 further communicate, directly or indirectly, with a static analysis module 222 included in or otherwise associated with the AMS 214. The security hub includes an event collector, an intrusion detection system (IDS) plugin, a sandbox plugin, and the AMS 214. In some embodiments, the MUX and the security hub, including the AMS 214, and the VCIs 208-209 operate in the hypervisor's user space. The static analysis module 222, in some embodiments, is a containerized service that also operates in the user space of the hypervisor (e.g., as part of the AMS 214 or otherwise associated with the AMS 214. In other examples, the static analysis module 222 operates outside of the host device 202.

Further, in some examples, the VCIs 208-209 are endpoint machines executing on the host device 202. The VCIs 208-209 are VMs in some embodiments, containers in other embodiments, or a mix of VMs and containers in still other embodiments. On each VCI, a Guest Introspection (GI) agent 218 executes to collect data associated with scripts and notify the security hub of any pending script execution events. In some embodiments, the security hub receives event notifications from the GI agents 218 of the VCIs 208-209 on its host through a variety of different ways. For instance, in some embodiments, the GI agent 218 on a VCI registers hooks (e.g., callbacks) with one or more modules (e.g., kernel-space modules or user-space modules) in the VCI's operating system for all new network connection events and all new process events (e.g., events that may be associated with executing a script).

Additionally, in some examples, the AMS 214 and the GI Agent 218 are configured according to the Anti-Malware Scan Interface (AMSI) framework (e.g., in examples using WINDOWS Guest VMs). The AMSI framework is a standard configured to enable malware scan providers to expose interfaces to scanning utilities to other applications and services of a system (e.g., web browsers, scripting engines). AMSI interfaces can be invoked by any AMSI-aware applications (e.g., WINDOWS scripting engines such as POWERSHELL, WINDOWS Scripting Host (WSH), JAVASCRIPT, VBSCRIPT, or other custom-built AMSI-aware applications). AMSI scan interface calls include attributes for identifying the invoking application such as application name, content size, content address, and/or command line attributes. In such examples, the GI agent 218 registers an in-process AMSI provider Dynamic Link Library (DLL). The DLL includes a scan interface that is invoked by AMSI-aware applications prior to executing any scripts as described herein. The GI agent 218 is configured for each VCI 208-209 to enable AMSI-aware applications executing thereon to call the scan function defined in the DLL of the GI agent 218, which acts as a scanner proxy of the AMS 214 (and/or scan functions of other AMSI service provider applications on the host device 202).

Upon occurrence of a new script execution event, the GI agent 218 receives a callback from its VCI's operating system (OS) and based on this callback, provides an event identifier to the security hub, in some embodiments. The event identifier provides a set of attributes pertaining to the event. These event attributes in some embodiments can include an identifier of a requested script execution process, a user identifier associated with the requesting process, and/or a group identifier (e.g., an activity directory (AD) identifier) associated with the requesting process.

In some examples, the OS of the VCI 208 delays a new script-related event (e.g., delays execution of the script) until the GI agent 218 on that VCI directs it to proceed with executing the script. In some of these embodiments, the GI agent 218 only allows the OS to proceed with executing the script after the AMS 214 has either determined that the script is known and does not contain malware or has allowed the OS to proceed while the script data 212 is analyzed for malware.

Further, the AMS 214 is responsible for determining whether a script associated with script data 212 on one of the VCIs 208 is a known script, and whether the script is allowed to be executed (e.g., run or performed). When a new script execution event occurs, the event collector receives the event notification from the GI agent 218 via the MUX. The event collector, in some examples, monitors these events for known malicious activity and policy violations. Additionally, or alternatively, the AMS 214 enforces policies from a set of policy rules in a policies storage of the AMS 214. In some such examples, these policies include policy rules from a policy manager outside the host device 202.

The script verdict cache 220 stores records that include mappings of scripts or script identifiers and/or script data patterns for scripts known to the host device 202 and/or other host devices of the system 200 and verdicts indicating whether these scripts are known to contain malware. Upon receiving a malware scan request for script data 212 at the AMS 214, the AMS 214 checks the script verdict cache 220 to determine whether a record for the script associated with the script data 212 exists, indicating the script is a known script. When a record for the script does exist, the AMS 214 either allows the script execution to proceed or denies the script execution, based on whether the script is known to contain malware. In some examples, the record associated with a script may indicate a status for the script as "sandboxing in progress". In some such examples, the script-related event would be allowed to proceed while the script is being analyzed via sandboxing in order to ensure the associated VCI continues to function, even if the script results in malicious behavior of malware. After a definitive verdict is available, that verdict is used to determine whether the script is allowed to execute.

Additionally, or alternatively, the malware scanning processes associated with the AMS 214 include local analysis of scripts and cloud analysis of scripts. In some such examples, local analysis includes cache lookup using the script verdict cache 220 and/or application of a set of rules to the script data (which is updated by the centralized cloud system) to determine if the script is malicious.

Further, in some examples, the script verdict cache 220 stores script mappings using identifiers of the scripts (e.g., names of the scripts or other information present in the scripts for identifying the scripts) mapped to malware scan verdicts. Additionally, or alternatively, the script verdict cache 220 stores script mappings using script data patterns mapped to malware scan verdicts. In such examples, script data patterns include consistent patterns of text in the script data 212 that can be used to differentiate a script from other scripts (e.g., the pattern of function calls of the script, the pattern of data being targeted in function calls of the scripts, or some combination thereof). Such script data patterns are determined directly from the plain text of the script data 212 as stored in the memory buffer 210 and/or by hashing at least a portion of the plain text of the script data 212, such that the resulting hash value can be used as a key in a script mapping of the script stored in the script verdict cache. In other examples, other types of script data patterns are used to identify scripts and map them to verdicts in the script verdict cache 220 without departing from the description.

In some examples, the AMS 214 includes a sandbox plugin that points to a sandboxing environment, such as the static analysis module 222. When the AMS 214 receives a request to scan a script by the GI agent 218 and the script is not found in the script verdict cache 220, it sends the script data 212 to the static analysis module 222, via the sandbox plugin, for sandboxing.

Further, in some examples, the static analysis module 222 of the AMS 214 communicates with the security analyzer 224 to inform the security analyzer 224 when a sandboxing operation is in progress. In some such examples, each AMS 214 of each host device 202 includes or is otherwise associated with a static analysis module 222 as described herein. In response, a service of the security analyzer 224 creates a record for the script that indicates that the script is being assessed for malware and stores the record in a datacenter script verdict cache 225. The datacenter script verdict cache 225 is similar to the script verdict cache 220 of the AMS 214, but it stores verdict data for the entire datacenter, including multiple host devices, while the script verdict cache 220 is configured as a host device-specific cache. This record is stored in the cache 225 of the security analyzer 224 and distributed via a reporting service and/or application programming interface (API) service to the host device 202 and/or other host devices of the system 200. The host device 202 then stores the record in the script verdict cache 220 of the AMS 214. In other examples, the security analyzer 224 instead provides a notification identifying the script and its status to the host devices, which use the notification to create their own records. Alternatively, or additionally, in examples where the local analysis by the AMS 214 is performed by applying a set of rules to the script data, the records distributed by the security analyzer include updated sets of rules that have been adapted to account for new script verdicts that have been determined.

In some examples, the static analysis module 222 is unable to determine a verdict when analyzing a script and the script is redirected to the centralized cloud service 216 (i.e., a threat intel cloud) via a cloud connector interface of the security analyzer 224. In some such examples, the security analyzer 224 includes a queue and scheduler that are configured to store queued scripts and schedule the sending of the queued scripts to the centralized cloud service 216.

Further, the security analyzer 224 provides scripts to the sandboxing service 226 of the centralized cloud service 216, which performs a sandboxing operation on scripts to assess scripts for malware. In some such examples, the sandboxing service 226 is configured to use other tools and/or techniques than the static analysis module 222 (e.g., YARA rules and/or VMWARE NSX-LASTLINE capabilities). The sandboxing service 226 is further configured to report sandboxing results to the security analyzer 224. Additionally, or alternatively, the sandboxing service 226 includes APIs and/or other components configured for troubleshooting issues associated with the sandboxing operations.

In some examples, the centralized cloud service 216 includes a reputation data store 228 configured to store and be updated with verdicts for scripts analyzed by the centralized cloud service 216. Further, the reputation data store 228 includes a cache component and/or a database component for storing script data and associated verdicts. Additionally, or alternatively, a reputation update service 230 then provides the record to the status analysis module 222 and/or the security analyzer 224, which is configured for updating records stored by the host devices (e.g., host device 202) in script verdict caches (e.g., script verdict cache 220).

The verdict determination is then provided (e.g., via the security analyzer 224) to host devices (e.g., host device 202) in the datacenter for use in evaluating subsequent attempts to execute the associated script. Each host device updates their existing record associated with the script (i.e., the record identifying the script as a known script being assessed for malware) with the received verdict determination. Accordingly, upon receiving a subsequent request to execute the script, each host device identifies the script as a known script and either allow the script to be executed when the script does not contain malware or deny the script from being executed when the file does contain malware.

Further, in some examples, the AMS 214 is configured to intelligently determine what events at the VCI 208 result in a malware scan request to the AMS 214. For instance, the VCI 208 is configured to determine when a script call is a function script function call associated with standard operations and/or shell commands of the VCI 208 rather than a script that is obtained from an outside source and, based on the script call being a recognized script function call, the VCI 208 and/or GI agent 218 are configured to refrain from sending a malware scan request to the AMS 214. Other such exclusions are performed based on predefined exclusion rules, regular expression output that indicates the execution of regular shell commands rather than scripts, and/or cached verdict information as described herein.

Additionally, or alternatively, in some examples, the VCI 208 and/or GI agent 218 are configured to maintain a VCI-specific cache of scripts that have been performed recently and/or found to not contain malware previously. If a script is scheduled to be executed and it matches a script that is cached in the VCI-specific cache (e.g., the script to be run is identical to a cached script that is known to not include malware), the VCI 208 is configured to refrain from sending the malware scan request to the AMS 214. Such VCI-specific caches can be migrated with the VCI to another host and used there. In other examples, other methods of intelligently determining when a malware scan request is necessary or unnecessary are used without departing from the description.

Figure 3:
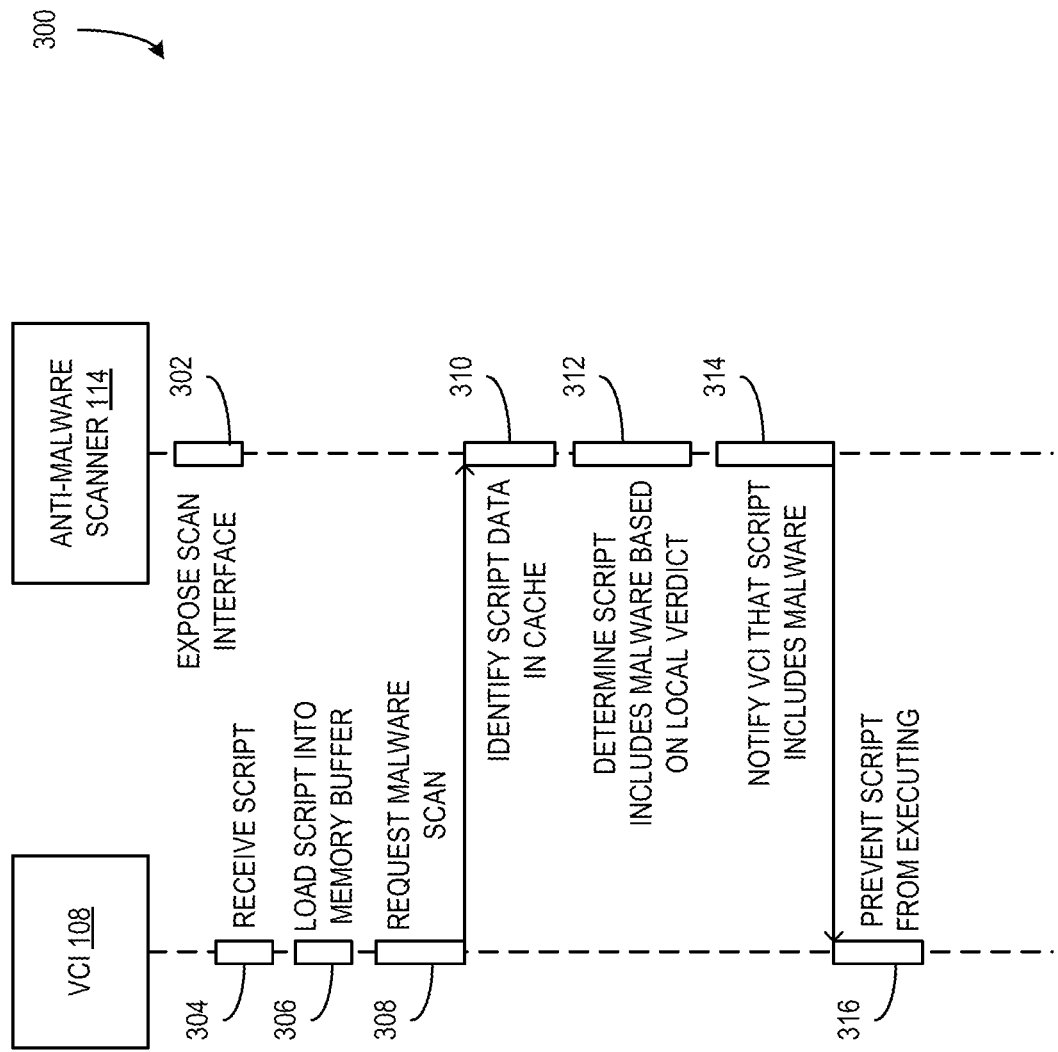
FIG. 3 is a sequence diagram illustrating a process of an anti-malware scanner (AMS) determining that a script includes malware in response to a malware scan request from a VCI.

FIG. 3 is a sequence diagram illustrating a process 300 of an AMS 114 determining that a script includes malware in response to a malware scan request from a VCI 108. In some examples, the process 300 is performed in a system such as system 100 of FIG. 1 or system 200 of FIG. 2 as described herein.

At 302, the AMS 114 exposes a scan interface. In some examples, the scan interface is configured to be compatible with the AMSI standard. Further, exposing the scan interface includes making the scan interface available via registry to the VCI 108 and/or other VCIs that are being executed on the host device upon which the AMS 114 is located. The scan interface is configured to enable the VCIs of the host device to send malware scan requests to the AMS 114 as described herein. Alternatively, in other examples, other frameworks are used without departing from the description.

At 304, the VCI 108 receives a script to be executed and, at 306, the VCI 108 loads the script into its memory buffer.

In some examples, the script is received from an external source (e.g., via an external network like the Internet). Further, the data of the script is loaded into the memory buffer as plain text or in an otherwise un-obfuscated format. Further, in some examples, the VCI 108 includes an agent application that runs in the AMSI framework and/or other interfaces provided for other scripting engines. This agent application is used to detect and process the script as it is received as described herein.

At 308, the VCI 108 sends a malware scan request to the AMS 114 via the exposed scan interface of the AMS 114. The malware scan request includes script data of the script from the memory buffer or otherwise enables the AMS 114 to access the script data in the memory buffer.

At 310, the AMS 114 identifies script data of the script in the script verdict cache (e.g., the script verdict cache 220). In some examples, identifying the script data in the cache includes identifying a script name or other identifier in a script mapping of the cache. Alternatively, or additionally, identifying the script data in the cache includes identifying a pattern if the script data in a script mapping of the cache.

At 312, the AMS 114 determines that the script includes malware based on a local verdict (e.g., a verdict that is cached locally and/or based on local analysis). In some examples, this includes using the identified script data in the cache to map to a local verdict of the script as described herein.

At 314, the AMS 114 notifies the VCI 108 that the script includes malware. In some examples, the notification includes the cached script verdict. Further, in some examples, the notification includes instructions or recommendations for actions to be taken by the VCI 108 based on the script verdict (e.g., refrain from executing the script, record the source of the script as a possible source of malware, or the like).

At 316, the VCI 108 prevents the script from executing based on the notification from the AMS 114. In some examples, preventing the script from executing includes simply not executing it. Further, in some such examples, the VCI 108 clears the script data from the memory buffer, isolates the script data in some way, and/or flags the source of the script for future scrutiny as a possible malicious source of malware.

Figure 4:
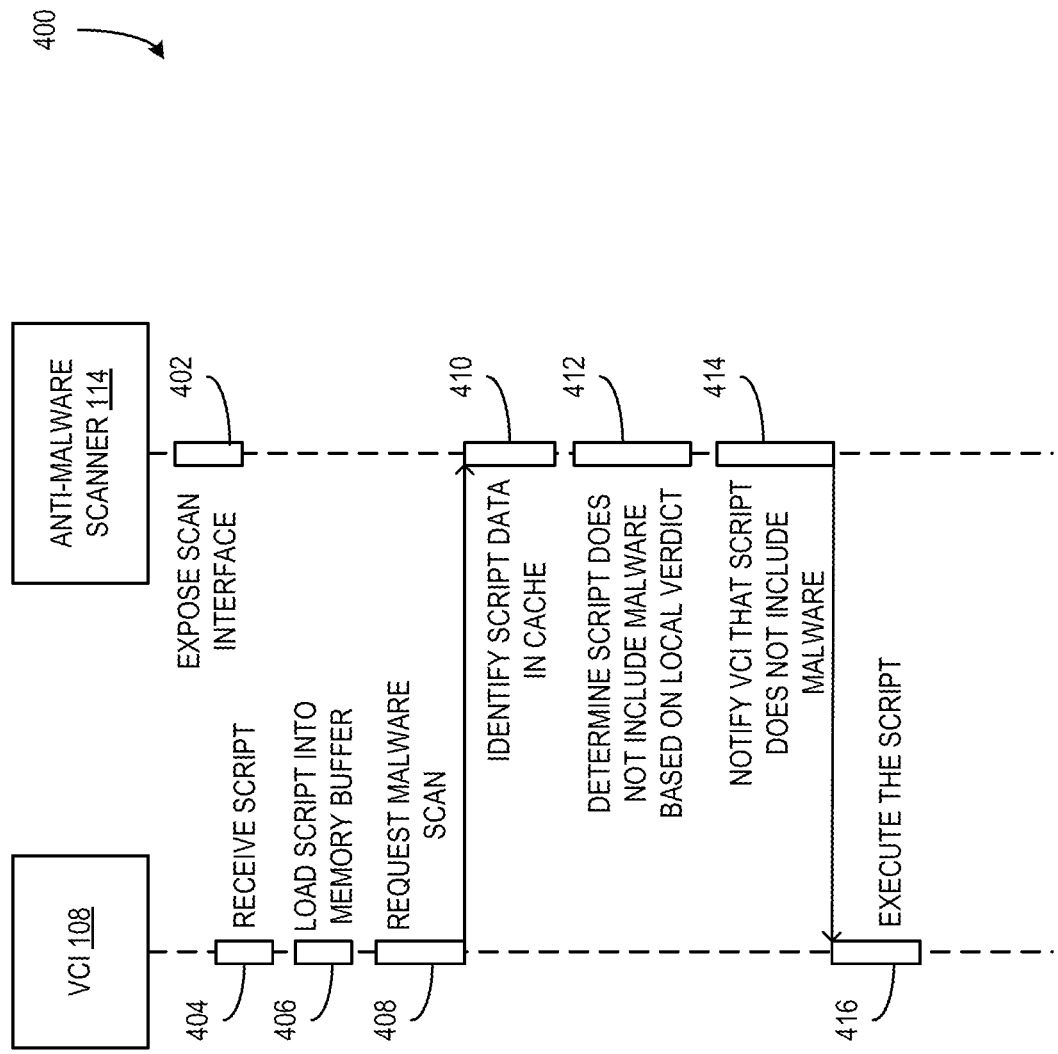
FIG. 4 is a sequence diagram illustrating a process of an AMS determining that a script does not include malware in response to a malware scan request from a VCI.

FIG. 4 is a sequence diagram illustrating a process 400 of an AMS 114 determining that a script does not include malware in response to a malware scan request from a VCI 108. In some examples, the process 400 is performed in a system such as system 100 of FIG. 1 or system 200 of FIG. 2 as described herein.

At 402, the AMS 114 exposes a scan interface. At 404, the VCI 108 receives a script to be executed and, at 406, the VCI 108 loads the script into its memory buffer. At 408, the VCI 108 sends a malware scan request to the AMS 114 via the exposed scan interface of the AMS 114. The malware scan request includes script data of the script from the memory buffer or otherwise enables the AMS 114 to access the script data in the memory buffer. At 410, the AMS 114 identifies script data of the script in the script verdict cache (e.g., the script verdict cache 220). It should be understood that the process 400 from 402-410 is substantially the same as the process 300 from 302-310 as described above with respect to FIG. 3.

At 412, the AMS 114 determines that the script does not include malware based on a local verdict. In some examples, this includes using the identified script data in the cache to map to a local verdict of the script as described herein.

At 414, the AMS 114 notifies the VCI 108 that the script does not include malware. In some examples, the notification includes the cached script verdict. Further, in some examples, the notification includes instructions or recommendations for actions to be taken by the VCI 108 based on the script verdict (e.g., proceed with execution of the script).

At 416, the VCI 108 executes the script based on the notification from the AMS 114. In some examples, executing the script further includes caching the script as being free of malware at the VCI-level as described herein.

Figure 5:
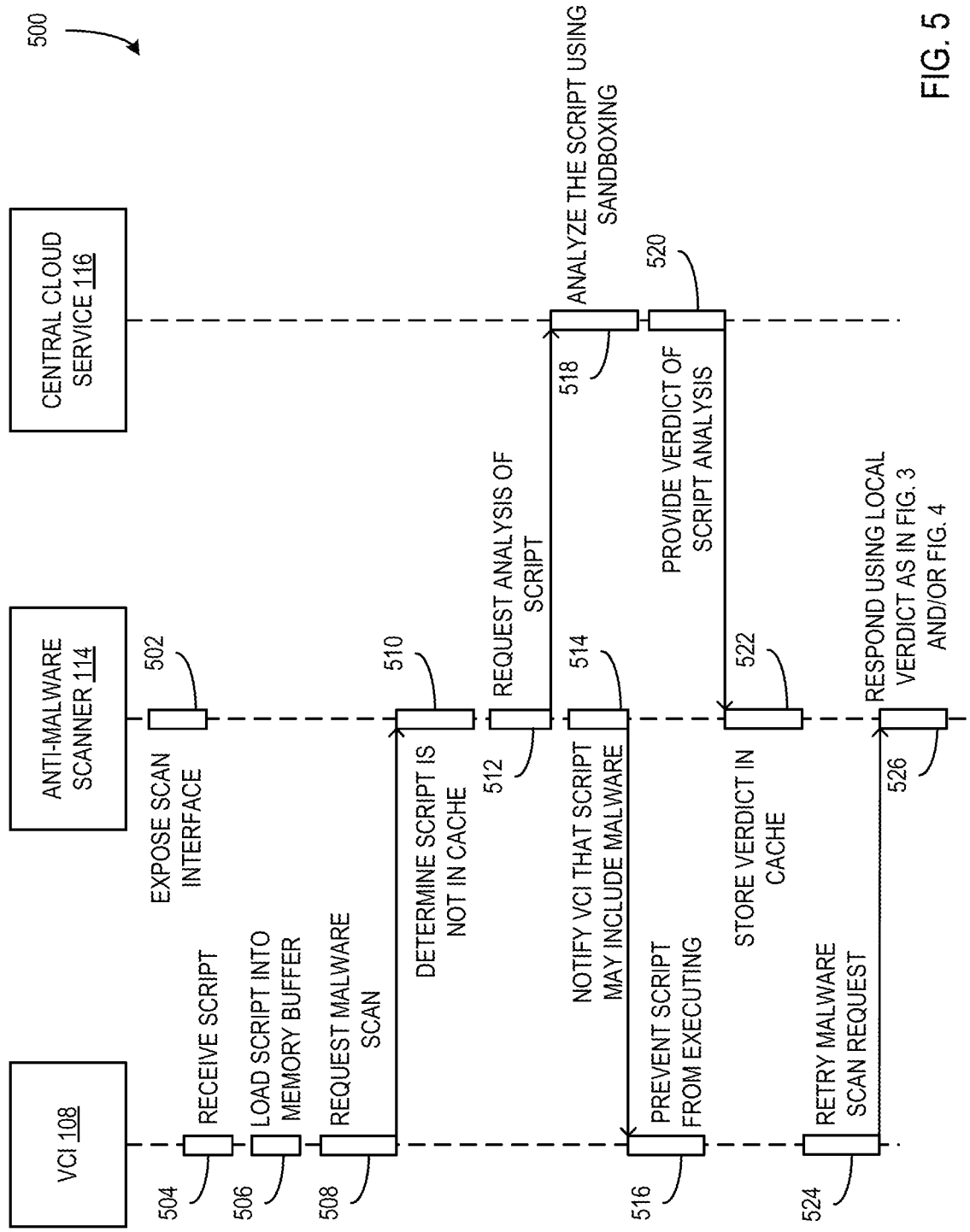
FIG. 5 is a sequence diagram illustrating a process of an AMS determining that a script is unknown in response to a malware scan request from a VCI and interacting with a central cloud service to analyze the script.

FIG. 5 is a sequence diagram illustrating a process 500 of an AMS 114 determining that a script is unknown in response to a malware scan request from a VCI 108 and interacting with a central cloud service 116 to analyze the script. In some examples, the process 500 is performed in a system such as system 100 of FIG. 1 or system 200 of FIG. 2 as described herein.

At 502, the AMS 114 exposes a scan interface. At 504, the VCI 108 receives a script to be executed and, at 506, the VCI 108 loads the script into its memory buffer. At 508, the VCI 108 sends a malware scan request to the AMS 114 via the exposed scan interface of the AMS 114. The malware scan request includes script data of the script from the memory buffer or otherwise enables the AMS 114 to access the script data in the memory buffer. It should be understood that the process 500 from 502-508 is substantially the same as the process 300 from 302-308 as described above with respect to FIG. 3.

At 510, the AMS 114 determines that the script to be scanned is not present in the script verdict cache. In some examples, determining that the script is not present includes comparing an identifier or other script pattern of the script with the entries in the script verdict cache and finding that none of the entries include script data that match the script to be scanned.

At 512, the AMS 114 requests analysis of the script from the central cloud server 116 based on the script being absent from the script verdict cache of the AMS 114.

Additionally, at 514, the AMS 114 notifies the VCI 108 that the script may include malware. In some examples, this notification is substantially the same as a notification that the script does include malware, but in other examples, the notification that the script is unknown and may include malware differs from a notification that the script is known and does include malware. At 516, in response to the notification, the VCI 108 prevents the script from executing because it has not been confirmed that the script is free of malware. In some examples, the VCI 108 is configured to prevent the script from executing upon receiving the notification, but the VCI 108 is further configured to retry the malware scan request later to determine whether a verdict has been found for the script (e.g., at 524 as described herein).

At 518, based on the request for analysis of the script from the AMS 114, the central cloud service 116 analyzes the script using sandboxing. In some examples, the central cloud service 116 loads the script data of the script into an isolated portion of memory and executes the script in such a way that its effects are isolated to a sandbox environment as described herein. The effects of the script execution are monitored to determine whether the script results in any malware behaviors. Based on this analysis, the central cloud server 116 arrives at a verdict as to whether the script includes malware or not.

At 520, the central cloud server 116 provides the verdict of the script analysis to the AMS 114 and the AMS 114 stores the verdict in its cache at 522.

Further, in some examples, the AMS 114 is configured to request script analysis from other entities of the system prior to sending a request to the central cloud service 116 (e.g., requesting analysis by the static analysis module 222 and/or the security analyzer 224, which are then configured to interact with the centralized cloud service 116 as described above with respect to FIG. 2).

Additionally, or alternatively, providing the verdict of the script analysis to the AMS 114 includes providing the verdict to a security analyzer 224 of the datacenter. The security analyzer 224 is then configured to share the verdict to the AMS 114 and any other AMS of a host device in the datacenter, as described above with respect to FIG. 2.

Later, at 524, the VCI 108 retries the malware scan request to the AMS 114 and, at 526, the AMS 114 responds to the request using the local verdict as described herein with respect to FIG. 3 or FIG. 4, depending on whether the verdict indicates that the script includes malware or not.

Figure 6:
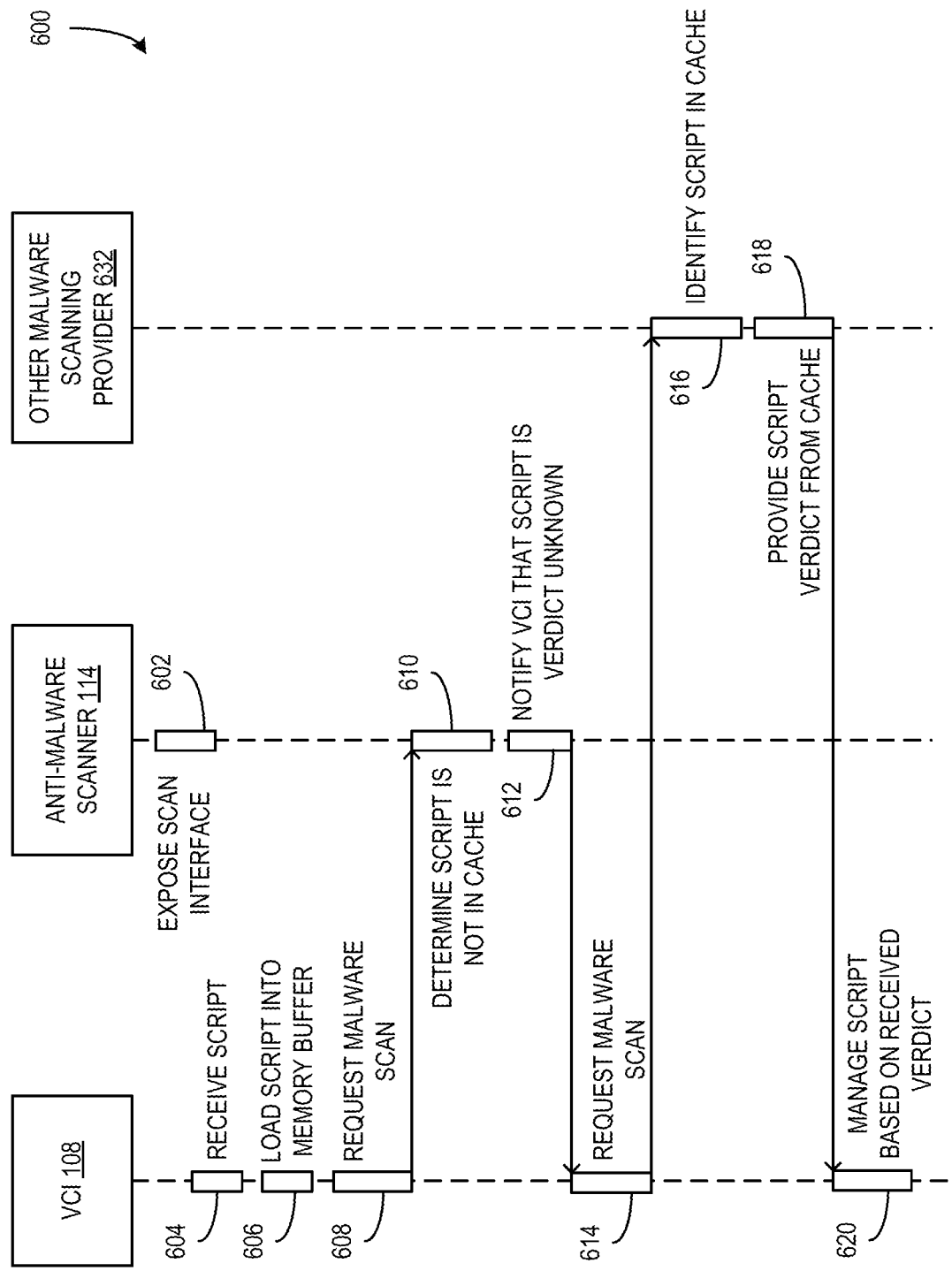
FIG. 6 is a sequence diagram illustrating a process of an AMS determining that a script is unknown in response to a malware scan request from a VCI and then the VCI requesting the malware verdict from another malware scanning provider.

FIG. 6 is a sequence diagram illustrating a process 600 of an AMS 114 determining that a script is unknown in response to a malware scan request from a VCI 108 and then the VCI 108 requesting the malware verdict from another malware scanning provider 632. In some examples, the process 600 is performed in a system such as system 100 of FIG. 1 or system 200 of FIG. 2 as described herein. Additionally, or alternatively, in some examples, the process 600 includes use of an AMSI framework that is configured to enable chaining of multiple malware scanning providers. When the AMS 114 returns an unknown verdict, the AMSI framework forwards the request of the VCI 108 to another registered malware scanning provider. If that provider happens to be a GI registered agentless solution, then the GI framework is configured to forward the request to it for a verdict. In some such examples, the scan request is returned to the AMSI framework on the VCI 108 to be forwarded to the next registered, available agentless solution.

At 602, the AMS 114 exposes a scan interface. At 604, the VCI 108 receives a script to be executed and, at 606, the VCI 108 loads the script into its memory buffer. At 608, the VCI 108 sends a malware scan request to the AMS 114 via the exposed scan interface of the AMS 114. The malware scan request includes script data of the script from the memory buffer or otherwise enables the AMS 114 to access the script data in the memory buffer. It should be understood that the process 600 from 602-608 is substantially the same as the process 300 from 302-308 as described above with respect to FIG. 3.

At 610, the AMS 114 determines that the script to be scanned is not present in the script verdict cache. In some examples, determining that the script is not present includes comparing an identifier or other script pattern of the script with the entries in the script verdict cache and finding that none of the entries include script data that match the script to be scanned.

At 612, based on determining that the script is not present in the cache, the AMS 114 notifies the VCI 108 that the script verdict is unknown. At 614, the VCI 108 requests a script verdict of the script from another malware scanning provider 632 (e.g., another scanner application associated with the AMSI framework). In some examples, the host device includes or otherwise has access to two (or more) malware scanning providers that are configured to be used in series. In the illustrated example, the AMS 114 is tried first and then, based on the AMS 114 failing to have a verdict for the script, the other malware scanning provider 632 is tried. In other examples, more, fewer, or different malware scanning providers are used in a different order without departing from the description (e.g., a different malware scanning provider is used first, followed by the AMS 114, and then followed by the malware scanning provider 632).

At 616, the malware scanning provider 632 identifies the script in its script verdict cache or equivalent thereof and, at 618, the malware scanning provider 632 provides the script verdict to the VCI 108.

At 620, the VCI 108 manages the script based on the received verdict. In some examples, if the verdict indicates that the script includes malware, the VCI 108 prevents the script from being executed or, if the verdict indicates that the script does not include malware, the VCI 108 executes the script.

In some examples, portions of process 600 and 500 occur when processing a script. For instance, in an example, the VCI 108 first requests the script verdict from the other malware scanning provider 632 and, upon determining that the other malware scanning provider 632 does not have a script verdict in cache, the AMS 114 then requests a script analysis from the central cloud service 116, as described above with respect to 512 of process 500. In other examples, other combinations of portions of the processes described herein are used without departing from the description.

Figure 7:
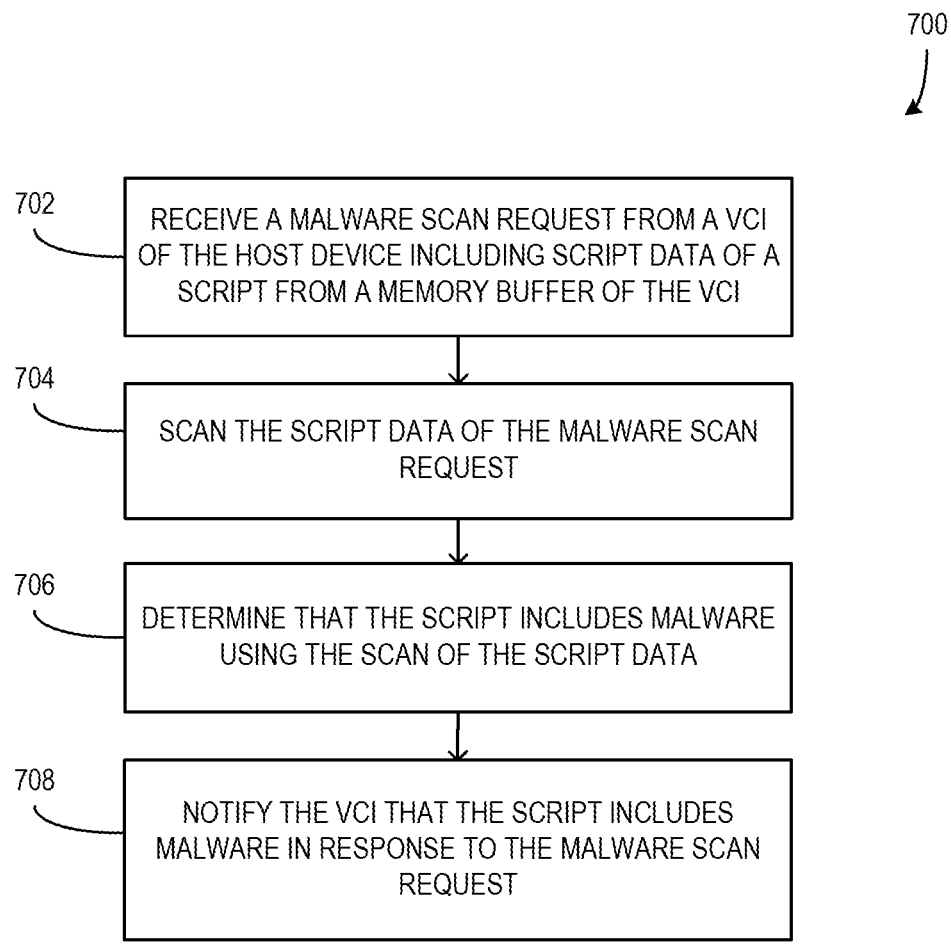
FIG. 7 is a flowchart illustrating a method for determining that a script includes malware by an AMS in response to a malware scan request.

FIG. 7 is a flowchart illustrating a method 700 for determining that a script includes malware by an AMS in response to a malware scan request. In some examples, the method 700 is executed or otherwise performed in a system such as systems 100 and 200 of FIGS. 1 and 2, respectively. At 702, a malware scan request is received at an AMS of a host device from a VCI that is also hosted on the host device. The malware scan request includes script data of a script from a memory buffer of the VCI. In some examples, the script data from the memory buffer is in a plain text form or other un-obfuscated form. Further, in some examples, the AMS receives the malware scan request via a scan interface (e.g., an interface configured for the AMSI standard) that is exposed by the AMS to the VCI and/or other VCIs hosted on the host device. In such examples, the VCI includes a GI agent (e.g., GI agent 218) that is configured to direct script-based malware scan requests to the AMS via the exposed interface.

At 704, the AMS scans the script data of the malware scan request. In some examples, scanning the script data includes comparing portions of the script data to a script verdict cache of the AMS (e.g., a script identifier and/or other script data pattern) to determine whether the script is known to the AMS. If the script is known and a verdict is stored in the cache, the AMS retrieves the verdict from the cache during the scan. Alternatively, if the script is unknown, the AMS is configured to further analyze the script and/or request analysis of the script from another entity (e.g., a static analysis module 222, a security analyzer 224, and/or a centralized cloud service 216 with a sandboxing service 226) as described herein.

At 706, the AMS determines that the script includes malware using the scan of the script data. In some examples, determining that script includes malware is based on a verdict of the script that is stored in the script verdict cache of the AMS.

At 708, the AMS notifies the VCI that the script includes malware in response to the malware scan request. In some examples, the notification includes the verdict information and/or instructions regarding how to process the script. Further, the VCI is configured to prevent the script from being executed based on the notification that the script includes malware. For instance, in an example, the VCI refrains from executing the script, removes the script data from the memory buffer, and/or flags the source of the script as a potential source of malware for future use.

Figure 8:
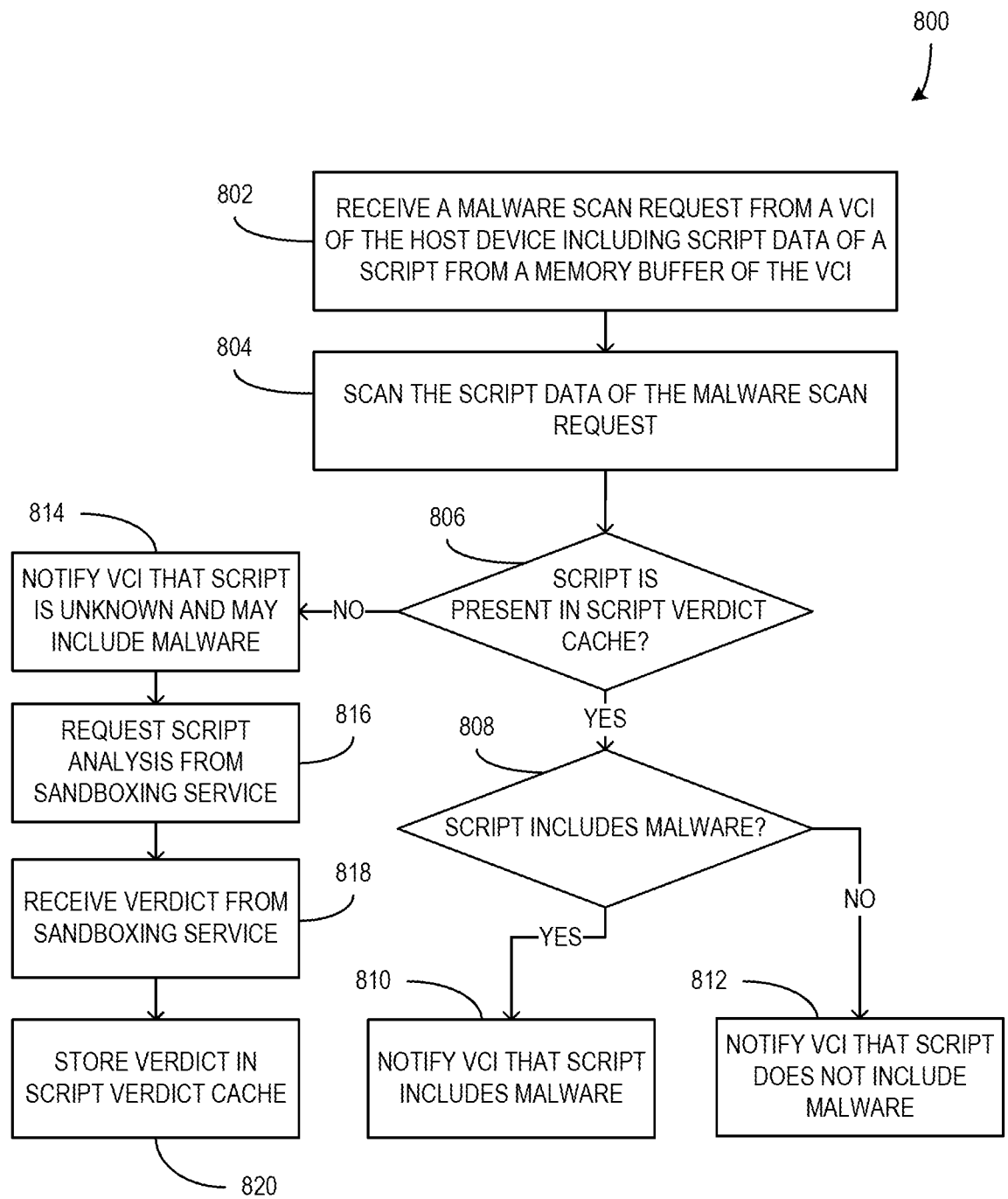
FIG. 8 is a flowchart illustrating a method for processing a malware scan request by an AMS.

FIG. 8 is a flowchart illustrating a method for processing a malware scan request by an AMS. In some examples, the method 800 is executed or otherwise performed in a system such as systems 100 and 200 of FIGS. 1 and 2, respectively. At 802, a malware scan request is received at an AMS of a host device from a VCI that is also hosted on the host device. In some examples, the reception of the malware scan request at 802 is substantially the same as 702 of FIG. 7 as described above.

At 804, the script data of the malware scan request is scanned and, at 806, it is determined whether the associated script is present in the script verdict cache. If the script is present in the script verdict cache, the process proceeds to 808. Alternatively, if the script is not present in the script verdict cache, the process proceeds to 814.

At 808, if the script includes malware based on the associated entry in the script verdict cache, the process proceeds to 810. Alternatively, if the script does not include malware based on the cache entry, the process proceeds to 812. At 810, the VCI is notified that the script includes malware, enabling the VCI to prevent the script from being executed as described herein. Alternatively, at 812, the VCI is notified that the script does not include malware, enabling the VCI to execute the script.

At 814, because the script is not present in the VCI cache and further analysis of the script may require additional time (e.g., multiple minutes), the VCI is notified that the script is unknown and that it may include malware. This notification enables the VCI to prevent the script from being executed immediately. Further, in some examples, the VCI is configured to retry the script later. Additionally, or alternatively, in some examples, the AMS and/or the VCI are configured to send the malware scan request to another scanner application present on the host device to determine whether that other scanner application has a verdict for the script. This process of sending the request to other scanner applications is performed for all present scanner applications until a verdict is found or all of the scanner applications have been sent a request.

At 816, the AMS requests analysis of the script from a sandboxing service. In some examples, the request for analysis is potentially sent through multiple layers of applications, as described above with respect to system 200 of FIG. 2. In such examples, the request is sent to a static analysis module 222, which forwards the request to the security analyzer 224 of the datacenter. In some examples, the security analyzer 224 sends an analysis request to the centralized cloud service 216 for analysis outside of the datacenter. Verdicts that are determined at the centralized cloud service 216 are returned to the security analyzer 224, which distributes the verdict to the AMSs of the host devices of the system.

At 818, the AMS receives a verdict from the sandboxing service and, at 820, the AMS stores the verdict in the script verdict cache. In some examples, if the VCI retries the malware scan request with the same script, the AMS now has a verdict in the script verdict cache and will proceed to 808 from 806 as described above. Further, in some examples, upon receiving a verdict, the AMS is configured to notify the requesting VCI that a verdict has been determined for the script. The VCI is configured to receive such notifications and perform operations in response, such as executing the script if it is still waiting to be executed or notifying a user of the VCI that the script has been analyzed.

Exemplary Operating Environment

Figure 9:
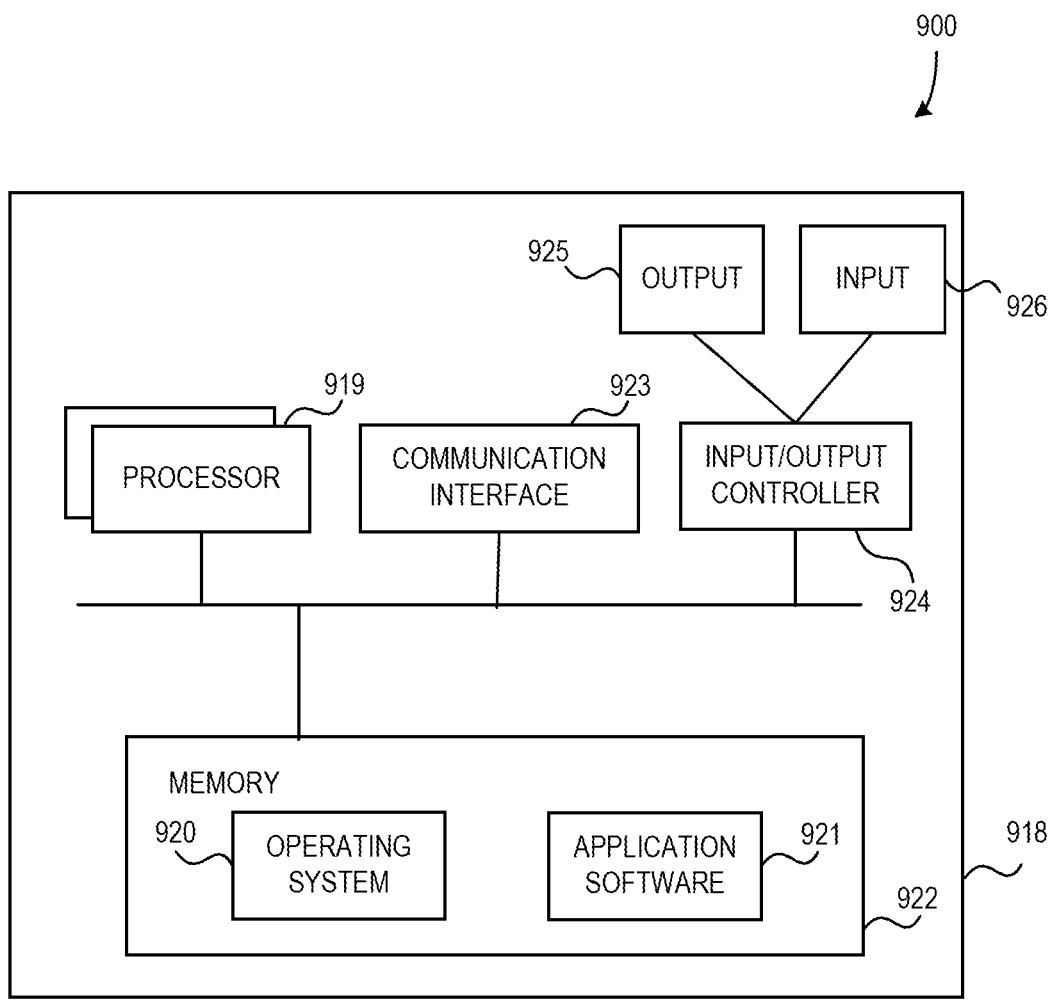
FIG. 9 illustrates an example computing apparatus as a functional block diagram.

The present disclosure is operable with a computing apparatus according to an embodiment as a functional block diagram 900 in FIG. 9. In an example, components of a computing apparatus 918 are implemented as a part of an electronic device according to one or more embodiments described in this specification. The computing apparatus 918 comprises one or more processors 919 which may be microprocessors, controllers, or any other suitable type of processors for processing computer executable instructions to control the operation of the electronic device. Alternatively, or in addition, the processor 919 is any technology capable of executing logic or instructions, such as a hard-coded machine. In some examples, platform software comprising an operating system 920 or any other suitable platform software is provided on the apparatus 918 to enable application software 921 to be executed on the device. In some examples, the processing of malware scan requests from VCIs by an AMS of a host device as described herein is accomplished by software, hardware, and/or firmware.

In some examples, computer executable instructions are provided using any computer-readable media that are accessible by the computing apparatus 918. Computer-readable media include, for example, computer storage media such as a memory 922 and communications media. Computer storage media, such as a memory 922, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 922) is shown within the computing apparatus 918, it will be appreciated by a person skilled in the art, that, in some examples, the storage is distributed or located remotely and accessed via a network or other communication link (e.g., using a communication interface 923).

Further, in some examples, the computing apparatus 918 comprises an input/output controller 924 configured to output information to one or more output devices 925, for example a display or a speaker, which are separate from or integral to the electronic device. Additionally, or alternatively, the input/output controller 924 is configured to receive and process an input from one or more input devices 926, for example, a keyboard, a microphone, or a touchpad. In one example, the output device 925 also acts as the input device. An example of such a device is a touch sensitive display. The input/output controller 924 may also output data to devices other than the output device, e.g., a locally connected printing device. In some examples, a user provides input to the input device(s) 926 and/or receive output from the output device(s) 925.

The functionality described herein can be performed, at least in part, by one or more hardware logic components. According to an embodiment, the computing apparatus 918 is configured by the program code when executed by the processor 919 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: at least one processor of a host device; and at least one memory comprising computer program code of an anti-malware scanner (AMS), the at least one memory and the computer program code configured to, with the at least one processor, cause the at least one processor to: receive, by the AMS, a malware scan request from a virtual computing instance (VCI) of the host device, wherein the malware scan request includes script data of a script from a memory buffer of the VCI; scan the script data of the malware scan request using the AMS; determine that the script includes malware using the scan of the script data; and notify the VCI that the script includes malware in response to the malware scan request, whereby the VCI is configured to prevent execution of the script.

An example computerized method comprises: receiving, by a processor of an anti-malware scanner (AMS), a malware scan request from a virtual computing instance (VCI) of a host device upon which the AMS is executed, wherein the malware scan request includes script data of a script from a memory buffer of the VCI; scanning, by the processor, the script data of the malware scan request using the AMS; determining, by the processor, that the script includes malware using the scan of the script data; and notifying, by the processor, the VCI that the script includes malware in response to the malware scan request, whereby the VCI is configured to prevent execution of the script.

One or more computer storage media have computer-executable instructions that, upon execution by a processor, cause the processor to at least: receive, by an anti-malware scanner (AMS), a malware scan request from a virtual computing instance (VCI) of the host device, wherein the malware scan request includes script data of a script from a memory buffer of the VCI; scan the script data of the malware scan request using the AMS; determine that the script includes malware using the scan of the script data; and notify the VCI that the script includes malware in response to the malware scan request, whereby the VCI is configured to prevent execution of the script.

Alternatively, or in addition to the other examples described herein, examples include any combination of the following:

further comprising: receiving, by the AMS, an additional malware scan request from an additional VCI of the host device, wherein the malware scan request includes additional script data of an additional script from a memory buffer of the additional VCI; scanning the additional script data of the additional malware scan request using the AMS; determining that the additional script does not include malware using the scan of the additional script data; and notifying the additional VCI that the additional script does not include malware in response to the additional malware scan request, whereby the additional VCI is configured to execute the additional script.

wherein scanning the script data of the malware scan request using the AMS includes identifying a script verdict entry associated with the script in a script verdict cache of the AMS using the script data of the malware scan request, the script verdict entry including a verdict indicating that the script includes malware.

wherein scanning the script data of the malware scan request using the AMS includes: determining that a script verdict cache of the AMS does not include script verdict entry associated with the script using the script data; notifying the VCI that the script is unknown and may include malware; requesting analysis of the script data from a sandboxing service; receiving a verdict from the sandboxing service, the verdict indicating that the script data includes malware; and storing the received verdict in the script verdict cache of the AMS.

wherein scanning the script data of the malware scan request using the AMS further includes sharing the received verdict to a security analyzer of the system, whereby the security analyzer is enabled to distribute the received verdict to another AMS of another host device of a system of the host device.

wherein scanning the script data of the malware scan request using the AMS includes: determining that a script verdict cache of the AMS does not include script verdict entry associated with the script using the script data; requesting a verdict of the script from a security analyzer of the system; receiving the verdict of the script from the security analyzer, the verdict indicating that the script data includes malware based on analysis performed by another scanner application of another host device of the system; and storing the received verdict in the script verdict cache of the AMS.

further comprising registering a scanner interface of the AMS with a malware scanning framework of the host device, whereby the registered scanner interface enables the AMS to receive the malware scan request via the malware scanning framework.

wherein receiving the malware scan request includes receiving the script data from the memory buffer of the VCI in plain text.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for receiving, by a processor of an anti-malware scanner (AMS), a malware scan request from a virtual computing instance (VCI) of a host device upon which the AMS is executed, wherein the malware scan request includes script data of a script from a memory buffer of the VCI; exemplary means for scanning, by the processor, the script data of the malware scan request using the AMS; exemplary means for determining, by the processor, that the script includes malware using the scan of the script data; and exemplary means for notifying, by the processor, the VCI that the script includes malware in response to the malware scan request, whereby the VCI is configured to prevent execution of the script.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   at least one processor of a host device; and
   at least one memory of the host device comprising computer program code of an anti-malware scanner (AMS), the at least one memory and the computer program code configured to, with the at least one processor, cause the at least one processor to:
   receive, by the AMS, a malware scan request from a virtual computing instance (VCI) of the host device, wherein the malware scan request includes script data of a script from a memory buffer of the VCI;
   scan, using the AMS outside of the VCI, the script data of the malware scan request;
   determine that the script includes malware based on the scan of the script data; and
   notify the VCI that the script includes malware, whereby the VCI is configured to prevent execution of the script.

2. The system of claim 1, wherein the at least one memory and the computer program code are configured to, with the at least one processor, further cause the at least one processor to:
   receive, by the AMS, an additional malware scan request from an additional VCI of the host device, wherein the malware scan request includes additional script data of an additional script from a memory buffer of the additional VCI;
   scan, using the AMS outside of the additional VCI, the additional script data of the additional malware scan request;
   determine that the additional script does not include malware using the scan of the additional script data; and
   notify the additional VCI that the additional script does not include malware in response to the additional malware scan request, whereby the additional VCI is configured to execute the additional script.

3. The system of claim 1, wherein scanning the script data of the malware scan request using the AMS includes identifying a script verdict entry associated with the script in a script verdict cache of the AMS using the script data of the malware scan request, the script verdict entry including a verdict indicating that the script includes malware.

4. The system of claim 1, wherein scanning the script data of the malware scan request using the AMS includes:
   determining that a script verdict cache of the AMS does not include script verdict entry associated with the script using the script data;
   notifying the VCI that the script is unknown and may include malware;
   requesting analysis of the script data from a sandboxing service;
   receiving a verdict from the sandboxing service, the verdict indicating that the script data includes malware; and
   storing the received verdict in the script verdict cache of the AMS.

5. The system of claim 4, wherein scanning the script data of the malware scan request using the AMS further includes sharing the received verdict to a security analyzer of the system, whereby the security analyzer is enabled to distribute the received verdict to another AMS of another host device of the system.

6. The system of claim 1, wherein scanning the script data of the malware scan request using the AMS includes:
   determining that a script verdict cache of the AMS does not include script verdict entry associated with the script using the script data;
   requesting a verdict of the script from a security analyzer of the system;
   receiving the verdict of the script from the security analyzer, the verdict indicating that the script data includes malware based on analysis performed by another scanner application of another host device of the system; and
   storing the received verdict in the script verdict cache of the AMS.

7. The system of claim 1, wherein the at least one memory and the computer program code are configured to, with the at least one processor, further cause the at least one processor to register a scanner interface of the AMS with a malware scanning framework of the host device, whereby the registered scanner interface enables the AMS to receive the malware scan request via the malware scanning framework.

8. The system of claim 1, wherein receiving the malware scan request includes receiving the script data from the memory buffer of the VCI in plain text.

9. A computerized method comprising:
receiving, by a processor of an anti-malware scanner (AMS), a malware scan request from a virtual computing instance (VCI) of a host device upon which the AMS is executed, wherein the malware scan request includes script data of a script from a memory buffer of the VCI;
scanning, by the processor of the host device outside of the VCI, the script data of the malware scan request using the AMS;
determining, by the processor, that the script includes malware using the scan of the script data; and
notifying, by the processor, the VCI that the script includes malware, whereby the VCI is configured to prevent execution of the script.

10. The computerized method of claim 9, further comprising:
receiving, by the AMS, an additional malware scan request from an additional VCI of the host device, wherein the malware scan request includes additional script data of an additional script from a memory buffer of the additional VCI;
scanning, using the AMS outside of the VCI, the additional script data of the additional malware scan request;
determining that the additional script does not include malware using the scan of the additional script data; and
notifying the additional VCI that the additional script does not include malware, whereby the additional VCI is configured to execute the additional script.

11. The computerized method of claim 9, wherein scanning the script data of the malware scan request using the AMS includes identifying a script verdict entry associated with the script in a script verdict cache of the AMS using the script data of the malware scan request, the script verdict entry including a verdict indicating that the script includes malware.

12. The computerized method of claim 9, wherein scanning the script data of the malware scan request using the AMS includes:
determining that a script verdict cache of the AMS does not include script verdict entry associated with the script using the script data;
notifying the VCI that the script is unknown and may include malware;
requesting analysis of the script data from a sandboxing service;
receiving a verdict from the sandboxing service, the verdict indicating that the script data includes malware; and
storing the received verdict in the script verdict cache of the AMS.

13. The computerized method of claim 12, wherein scanning the script data of the malware scan request using the AMS further includes sharing the received verdict to a security analyzer, whereby the security analyzer is enabled to distribute the received verdict to another AMS of another host device of a system of the host device.

14. The computerized method of claim 9, wherein scanning the script data of the malware scan request using the AMS includes:
determining that a script verdict cache of the AMS does not include script verdict entry associated with the script using the script data;
requesting a verdict of the script from a security analyzer;
receiving the verdict of the script from the security analyzer, the verdict indicating that the script data includes malware based on analysis performed by another scanner application of another host device; and
storing the received verdict in the script verdict cache of the AMS.

15. The computerized method of claim 9, further comprising registering a scanner interface of the AMS with a malware scanning framework of the host device, whereby the registered scanner interface enables the AMS to receive the malware scan request via the malware scanning framework.

16. The computerized method of claim 9, wherein receiving the malware scan request includes receiving the script data from the memory buffer of the VCI in plain text.

17. One or more computer storage media of a host device having computer-executable instructions that, upon execution by a processor, cause the processor to at least:
receive, by an anti-malware scanner (AMS), a malware scan request from a virtual computing instance (VCI) of the host device, wherein the malware scan request includes script data of a script from a memory buffer of the VCI;
scan, using the AMS outside of the VCI, the script data of the malware scan request using the AMS;
determine that the script includes malware using the scan of the script data; and
notify the VCI that the script includes malware, whereby the VCI is configured to prevent execution of the script.

18. The one or more computer storage media of claim 17, wherein the computer-executable instructions, upon execution by the processor, further cause the processor to at least:
receive, by the AMS, an additional malware scan request from an additional VCI of the host device, wherein the malware scan request includes additional script data of an additional script from a memory buffer of the additional VCI;
scan, using the AMS outside of the VCI, the additional script data of the additional malware scan request;
determine that the additional script does not include malware using the scan of the additional script data; and
notify the additional VCI that the additional script does not include malware in response to the additional malware scan request, whereby the additional VCI is configured to execute the additional script.

19. The one or more computer storage media of claim 17, wherein scanning the script data of the malware scan request using the AMS includes identifying a script verdict entry associated with the script in a script verdict cache of the AMS using the script data of the malware scan request, the script verdict entry including a verdict indicating that the script includes malware.

20. The one or more computer storage media of claim 17, wherein scanning the script data of the malware scan request using the AMS includes:
determining that a script verdict cache of the AMS does not include script verdict entry associated with the script using the script data;
notifying the VCI that the script is unknown and may include malware;
requesting analysis of the script data from a sandboxing service;

receiving a verdict from the sandboxing service, the verdict indicating that the script data includes malware; and storing the received verdict in the script verdict cache of the AMS.

* * * * *